United States Patent
Hajmasan et al.

(10) Patent No.: US 10,706,151 B2
(45) Date of Patent: *Jul. 7, 2020

(54) SYSTEMS AND METHODS FOR TRACKING MALICIOUS BEHAVIOR ACROSS MULTIPLE SOFTWARE ENTITIES

(71) Applicant: Bitdefender IPR Management Ltd., Nicosia (CY)

(72) Inventors: Gheorghe F. Hajmasan, Lunca Muresului (RO); Radu M. Portase, Viseu de Sus (RO)

(73) Assignee: Bitdefender IPR Management Ltd., Nicosia (CY)

( * ) Notice: Subject to any disclaimer, the term of this patent is extended or adjusted under 35 U.S.C. 154(b) by 184 days.

This patent is subject to a terminal disclaimer.

(21) Appl. No.: 16/148,242

(22) Filed: Oct. 1, 2018

(65) Prior Publication Data
US 2019/0034634 A1 Jan. 31, 2019

Related U.S. Application Data

(63) Continuation of application No. 14/808,173, filed on Jul. 24, 2015, now Pat. No. 10,089,465.

(51) Int. Cl.
*G06F 21/56* (2013.01)
*G06F 21/55* (2013.01)

(52) U.S. Cl.
CPC ............ *G06F 21/566* (2013.01); *G06F 21/55* (2013.01)

(58) Field of Classification Search
CPC ................................ G06F 21/566; G06F 21/55
See application file for complete search history.

(56) References Cited

U.S. PATENT DOCUMENTS

| | | |
|---|---|---|
| 7,620,992 B2 | 11/2009 | Monastyrsky et al. |
| 7,748,039 B2 | 6/2010 | Alagna et al. |

(Continued)

FOREIGN PATENT DOCUMENTS

WO 2010023557 A2 3/2010

OTHER PUBLICATIONS

Bitdefender, "BitDefender Active Virus Control: Pro Active Protection Against New and Emerging Threats," whitepaper, p. 1-10, Bitdefender Antivirus Software, Bucharest, Romania; Jan. 2010.

(Continued)

*Primary Examiner* — Noura Zoubair
(74) *Attorney, Agent, or Firm* — Law Office of Andrei D. Popovici, PC

(57) ABSTRACT

Described systems and methods allow protecting a computer system from malicious software. In some embodiments, a security application organizes a set of monitored executable entities (e.g., processes) into a plurality of groups, wherein members of a group are related by filiation and/or code injection. The security application may further associate a malice-indicative entity score with each monitored entity, and a malice-indicative group score with each entity group. Group scores may be incremented when a member of the respective group performs certain actions. Thus, even though actions performed by individual members may not be malware-indicative per se, the respective group score may capture collective malicious behavior and trigger malware detection.

19 Claims, 14 Drawing Sheets

(56) References Cited

U.S. PATENT DOCUMENTS

| | | |
|---|---|---|
| 7,870,612 B2 | 1/2011 | Liu |
| 7,908,660 B2 | 3/2011 | Bahl |
| 7,930,751 B2 | 4/2011 | Alagna et al. |
| 8,037,536 B2 | 10/2011 | Treadwell et al. |
| 9,323,931 B2 | 4/2016 | Lukacs et al. |
| 2004/0230835 A1 | 11/2004 | Goldfeder et al. |
| 2009/0077664 A1* | 3/2009 | Hsu .................. G06F 21/566 726/24 |
| 2010/0293615 A1 | 11/2010 | Ye |
| 2012/0311708 A1 | 12/2012 | Agarwal et al. |
| 2012/0324575 A1 | 12/2012 | Choi et al. |
| 2014/0165140 A1* | 6/2014 | Singla ................ G06F 21/554 726/1 |

OTHER PUBLICATIONS

European Patent Office, International Search Report and Written Opinion dated Feb. 19, 2015 for PCT International Application No. PCT/RO2014/000027, international filing date Sep. 25, 2014, priority date Oct. 4, 2013.

\* cited by examiner

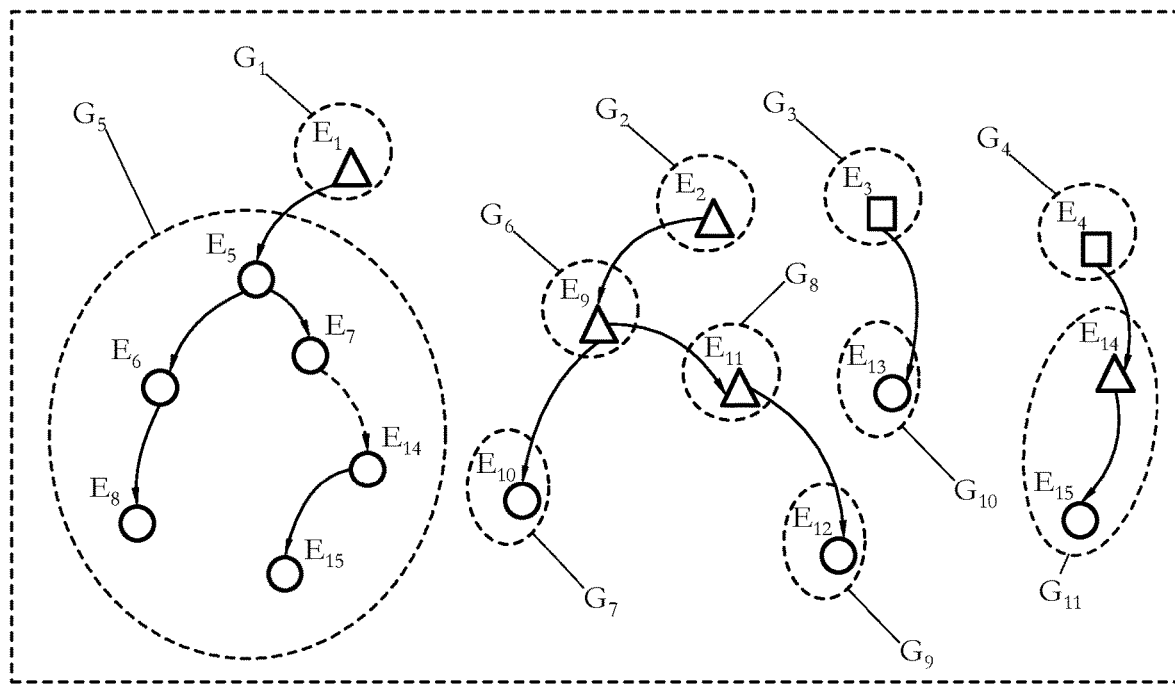
FIG. 5-A
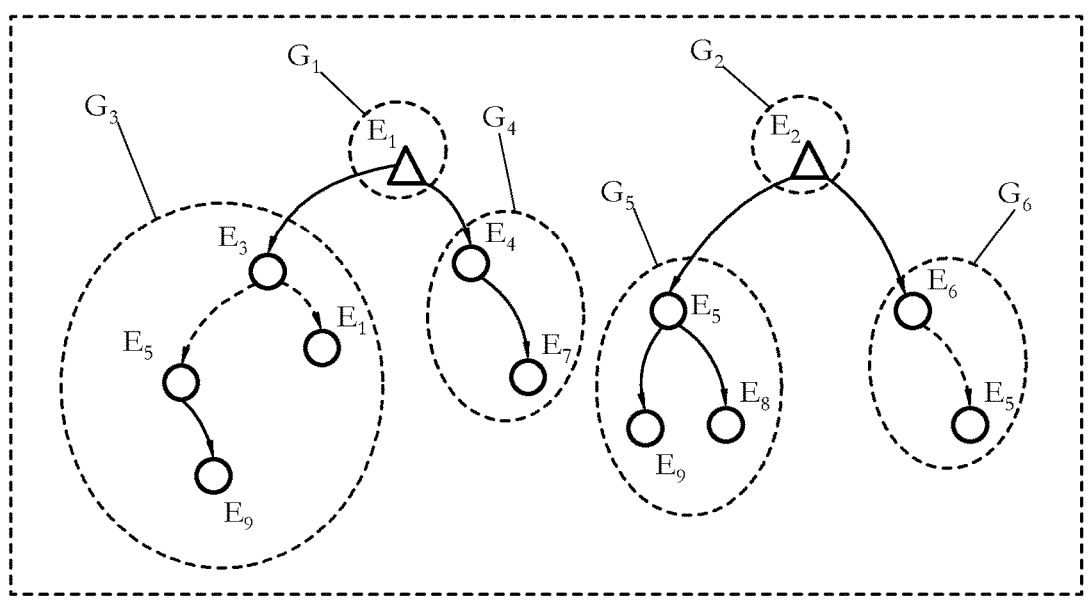
FIG. 5-B

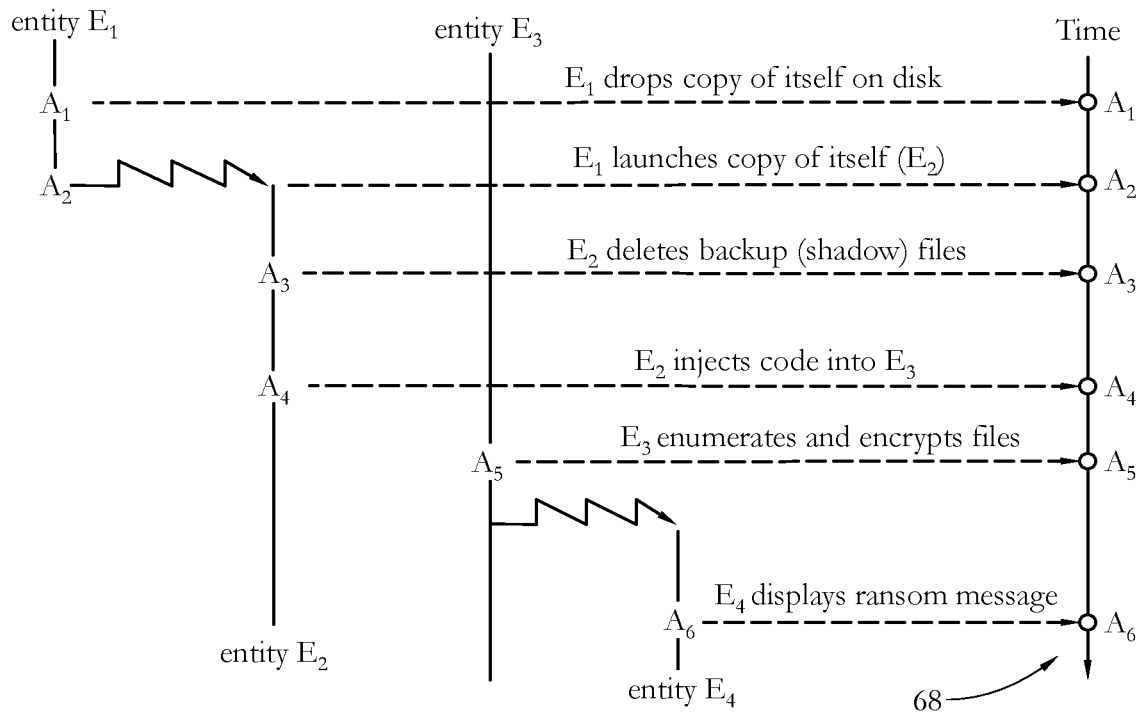
FIG. 7
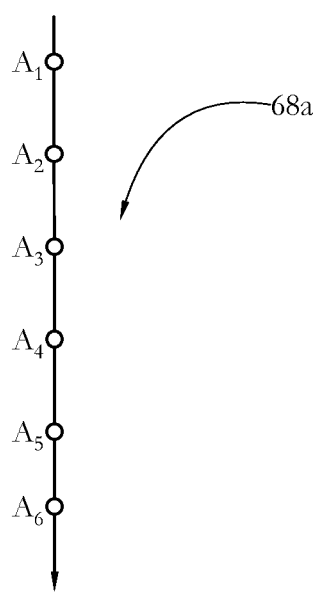 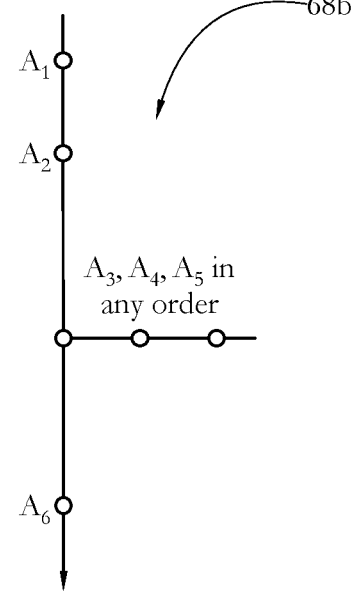
FIG. 8-A　　　　FIG. 8-B

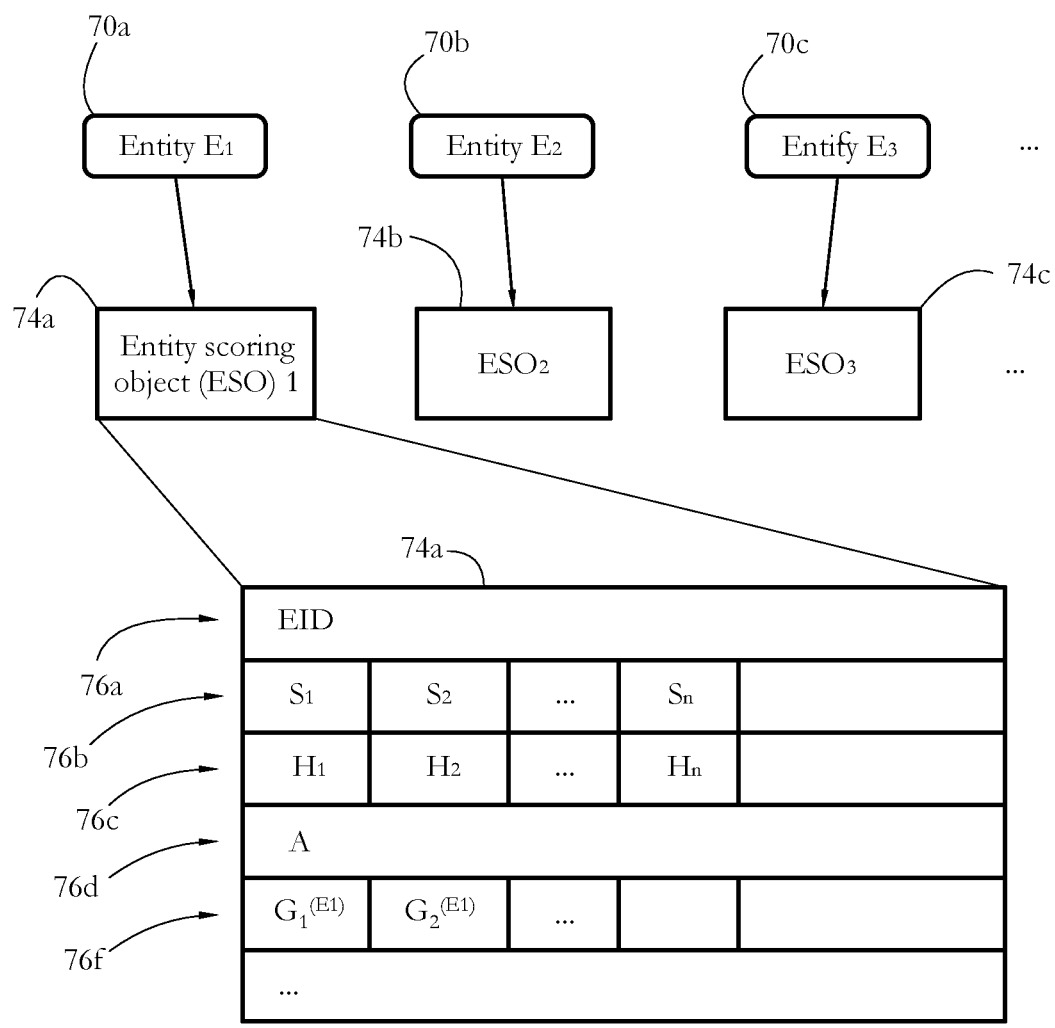
FIG. 10-A

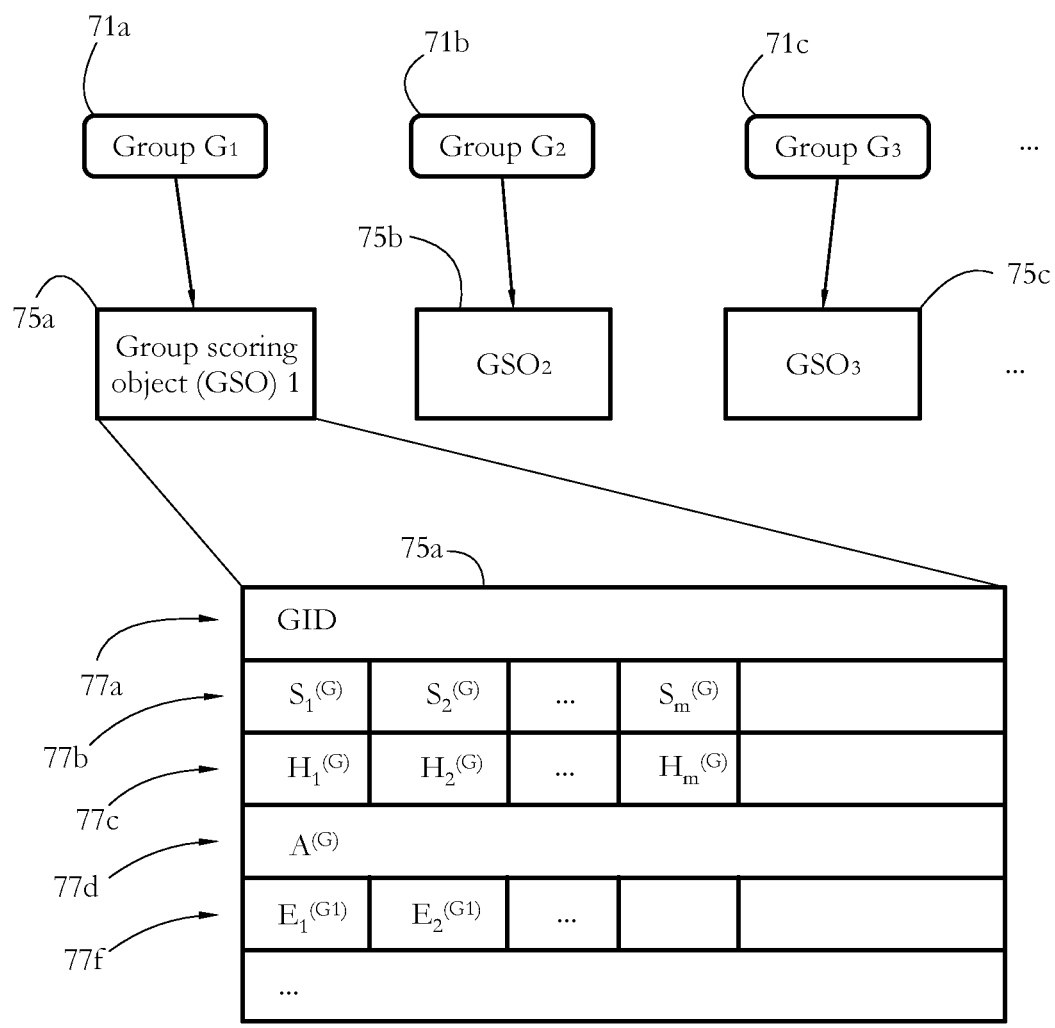
FIG. 10-B

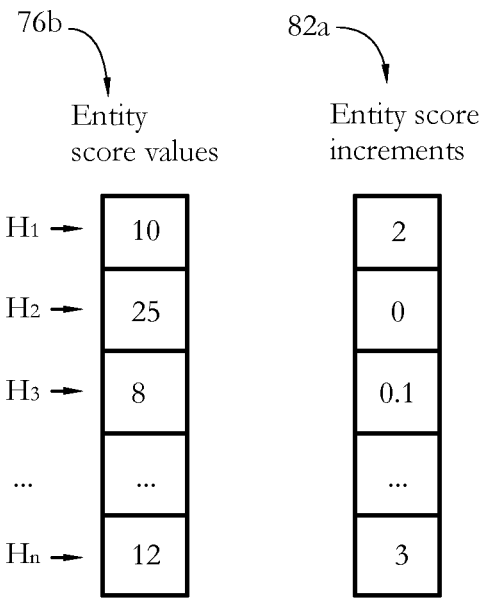
FIG. 11-A
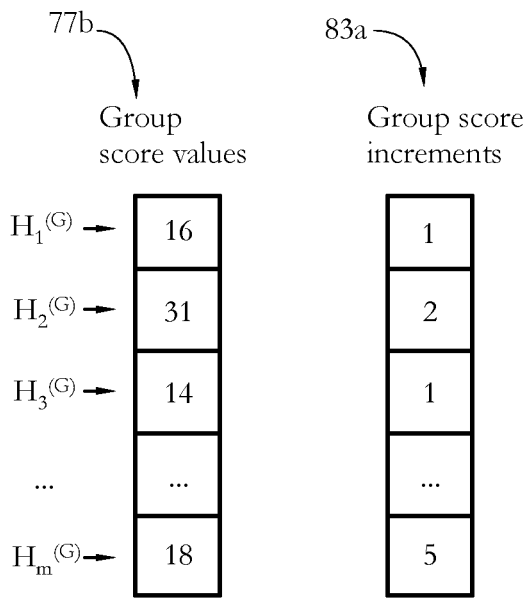
FIG. 11-B

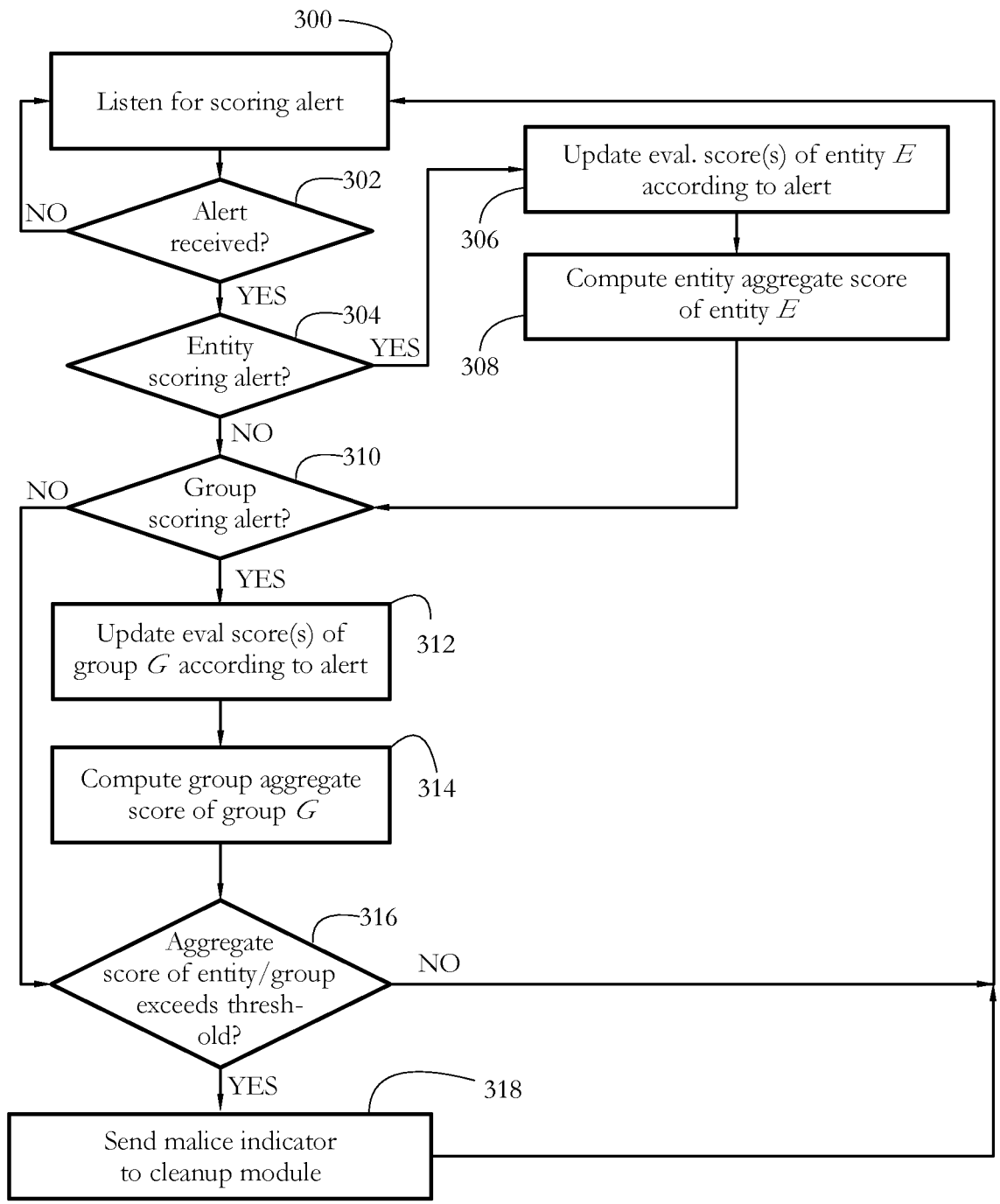
FIG. 12-A

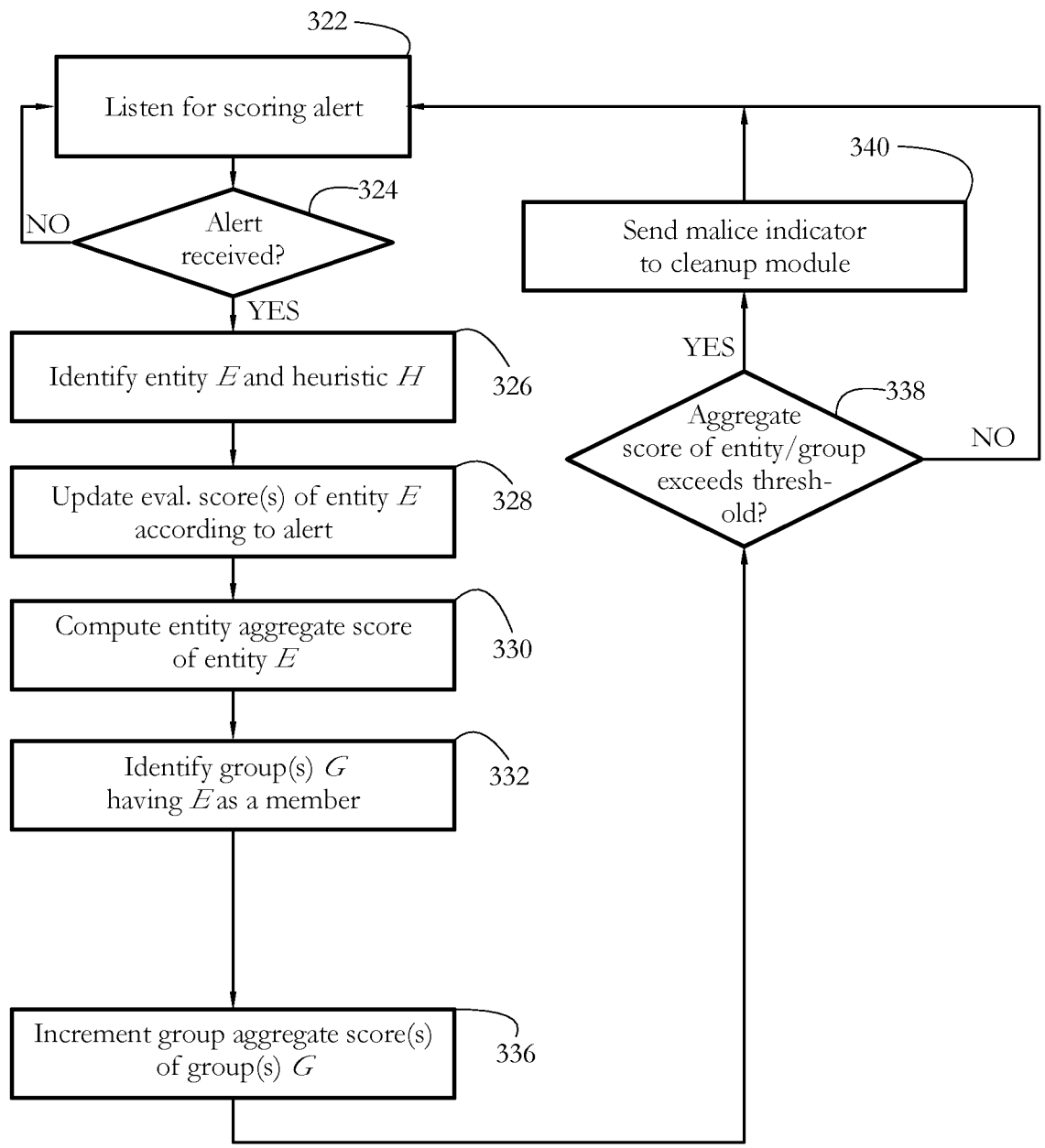
FIG. 12-B

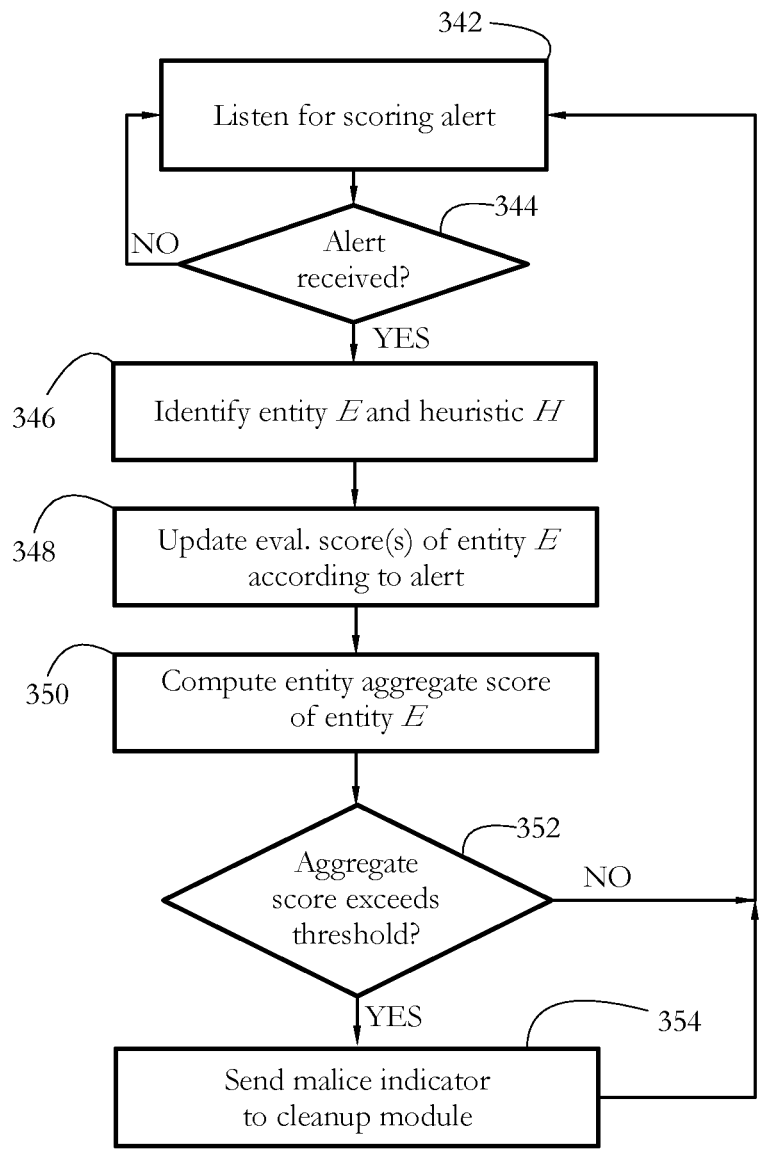
FIG. 12-C

SYSTEMS AND METHODS FOR TRACKING MALICIOUS BEHAVIOR ACROSS MULTIPLE SOFTWARE ENTITIES

RELATED APPLICATIONS

This application is a continuation of U.S. patent application Ser. No. 14/808,173, filed on Jul. 24, 2015, entitled "Systems and Methods for Tracking Malicious Behavior Across Multiple Software Entities," which is scheduled to issue on Oct. 2, 2018 as U.S. Pat. No. 10,089,465, the contents of which are incorporated by reference herein.

BACKGROUND

The invention relates to systems and methods for protecting computer systems from malicious software.

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to loss of data and sensitive information, identity theft, and loss of productivity, among others. Malware may further display material that is considered by some users to be obscene, excessively violent, harassing, or otherwise objectionable.

Security software may be used to detect malware infecting a user's computer system, and additionally to remove or prevent the execution of such malware. Several malware-detection techniques are known in the art. Some rely on matching a fragment of code of the malware agent to a library of malware-indicative signatures. Other conventional methods detect a malware-indicative behavior, such as a set of actions performed by the malware agent.

Malicious software relies on various strategies to evade detection. One such strategy involves obfuscation techniques, for instance encrypting malicious code, or using slightly different code versions on each infected computer (a feature commonly known as polymorphism). Another exemplary detection avoidance method divides malicious activities among a plurality of agents, wherein each agent performs a separate set of actions, which cannot be considered malware-indicative when taken in isolation from the actions performed by other agents.

There is a strong interest in developing systems and methods of detecting such advanced malware.

SUMMARY

According to one aspect, a computer system comprises at least one hardware processor and a memory, the at least one hardware processor configured to execute an entity manager and a scoring engine. The entity manager is configured to organize a collection of monitored executable software entities into a plurality of entity groups according to inter-entity relations selected from a group of relations consisting of a filiation relation and a code injection relation, wherein at least one entity of the collection simultaneously belongs to more than one entity group of the plurality of entity groups. The scoring engine is configured, in response to a detected action of the at least one entity, to select a first entity group from the plurality of entity groups according to whether the at least one entity belongs to the first entity group, and to select a second entity group from the plurality of entity groups according to whether the at least one entity belongs to the second entity group. The scoring engine is further configured, in response to selecting the first and second groups, to determine whether the compute system comprises malware according to a first action of a first member of the first entity group, and further according to a second action of a second member of the second entity group, the first and second members distinct from the at least one entity.

According to another aspect, a method comprises employing at least one hardware processor of a computer system to organize a collection of monitored executable entities into a plurality of entity groups according to inter-entity relations selected from a group of relations consisting of a filiation relation and a code injection relation, wherein at least one entity of the collection simultaneously belongs to more than one entity group of the plurality of entity groups. The method further comprises employing the at least one hardware processor to detect an action of the at least one entity. The method further comprises, in response to the detected action of the at least one entity, employing the at least one hardware processor to select a first entity group from the plurality of entity groups according to whether the at least one entity belongs to the first entity group, and selecting a second entity group from the plurality of entity groups according to whether the at least one entity belongs to the second entity group. The method further comprises, in response to selecting the first and second groups, employing the at least one hardware processor to determine whether the computer system comprises malware according to a first action of a first member of the first entity group, and further according to a second action of a second member of the second entity group, the first and second members distinct from the at least one entity.

According to another aspect, a non-transitory computer-readable medium stores instructions which, when executed by at least one hardware processor of a computer system, cause the computer system to form an entity manager and a scoring engine. The entity manager is configured to organize a collection of monitored executable software entities into a plurality of entity groups according to inter-entity relations selected from a group of relations consisting of a filiation relation and a code injection relation, wherein at least one entity of the collection simultaneously belongs to more than one entity group of the plurality of entity groups. The scoring engine is configured, in response to a detected action of the at least one entity, to select a first entity group from the plurality of entity groups according to whether the at least one entity belongs to the first entity group, and to select a second entity group from the plurality of entity groups according to whether the at least one entity belongs to the second entity group. The scoring engine is further configured, in response to selecting the first and second groups, to determine whether the computer system comprises malware according to a first action of a first member of the first entity group, and further according to a second action of a second member of the second entity group, the first and second members distinct from the at least one entity.

BRIEF DESCRIPTION OF THE DRAWINGS

The foregoing aspects and advantages of the present invention will become better understood upon reading the following detailed description and upon reference to the drawings where:

FIG. 5-A illustrates a set of entity groups comprising executable entities monitored for malicious behavior according to some embodiments of the present invention. Solid arrows represent entity creation; dashed arrows represent code injection.

FIG. 5-B illustrates another set of entity groups according to some embodiments of the present invention.

FIG. 7 shows an exemplary time sequence of actions performed by evasive malware, and an exemplary behavioral signature according to some embodiments of the present invention.

FIG. 8-A illustrates another exemplary behavioral signature according to some embodiments of the present invention.

FIG. 8-B illustrates yet another exemplary behavioral signature according to some embodiments of the present invention.

FIG. 10-A shows a plurality of exemplary entity scoring objects (ESO), each ESO determined for a respective executable entity according to some embodiments of the present invention.

FIG. 10-B shows a plurality of exemplary group scoring objects (GSO), each GSO determined for a respective group of executable entities, according to some embodiments of the present invention.

FIG. 11-A illustrates an exemplary set of entity score values and associated entity score increments according to some embodiments of the present invention.

FIG. 11-B illustrates an exemplary set of group score values and associated group score increments according to some embodiments of the present invention.

FIG. 12-A shows an exemplary sequence of steps performed by the scoring engine (FIG. 3) according to some embodiments of the present invention.

FIG. 12-B shows an alternative sequence of steps performed by the scoring engine according to some embodiments of the present invention.

FIG. 12-C shows yet another alternative sequence of steps performed by the scoring engine according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, against unintended or unauthorized modification of data and/or hardware, and against destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a heuristic is a procedure executed to determine whether the occurrence of a set of events is indicative of a computer security threat. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

Figure 1:
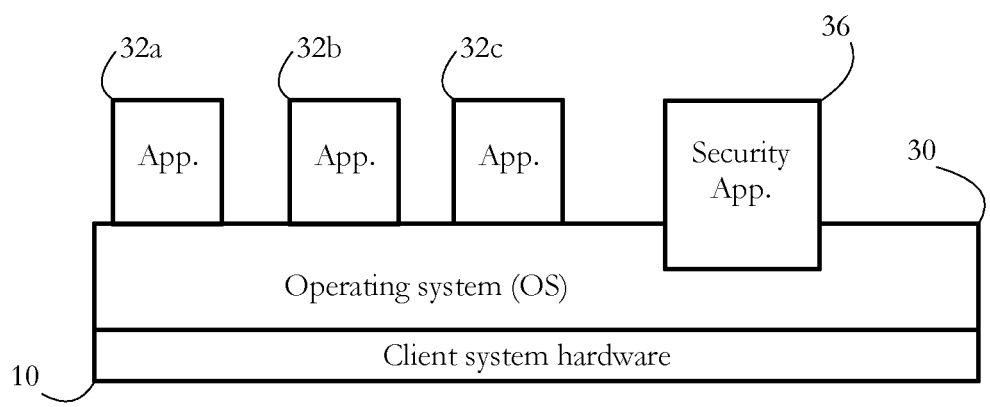
FIG. 1 shows an exemplary set of software objects including a security application executing on a client system according to some embodiments of the present invention.

FIG. 1 shows an exemplary set of software objects executing on a client system 10 protected from computer security threats according to some embodiments of the present invention. Client system 10 may represent a computer system (e.g., an end-user computer, a corporate server, etc.). Other exemplary client systems 10 include mobile computing devices (e.g., laptops, tablet PC's), telecommunication devices (e.g., smartphones), digital entertainment appliances (TV's, game consoles, etc.), wearable computing devices (e.g., smartwatches), or any other electronic device having a processor and a memory, and requiring computer security protection.

In some embodiments, an operating system (OS) 30 comprises software that provides an interface to the hardware of client system 10, and acts as a host for a set of software applications 32a-c and 36. OS 30 may comprise any widely available operating system such as Windows®, MacOS®, Linux®, iOS®, or Android®, among others. Applications 32a-c generically represent user software, which may include, for example, word processing, image processing, database, browser, and electronic communication applications, among others. In some embodiments, a security application 36 executes concurrently with applications 32a-c and is configured to determine whether any software executing on client system 10 (including applications 32a-c and OS 30) poses a computer security threat. For instance, application 36 may detect malware and/or spyware. Application 36 may be further configured to erase or otherwise incapacitate such malicious software, and to alert a user of client system 10 or a system administrator. Security application 36 may be a standalone program, or may form part of a software suite comprising, among others, anti-malware, anti-spam, and anti-fraud components. The operation of security application 36 is described in detail below.

Figure 2:
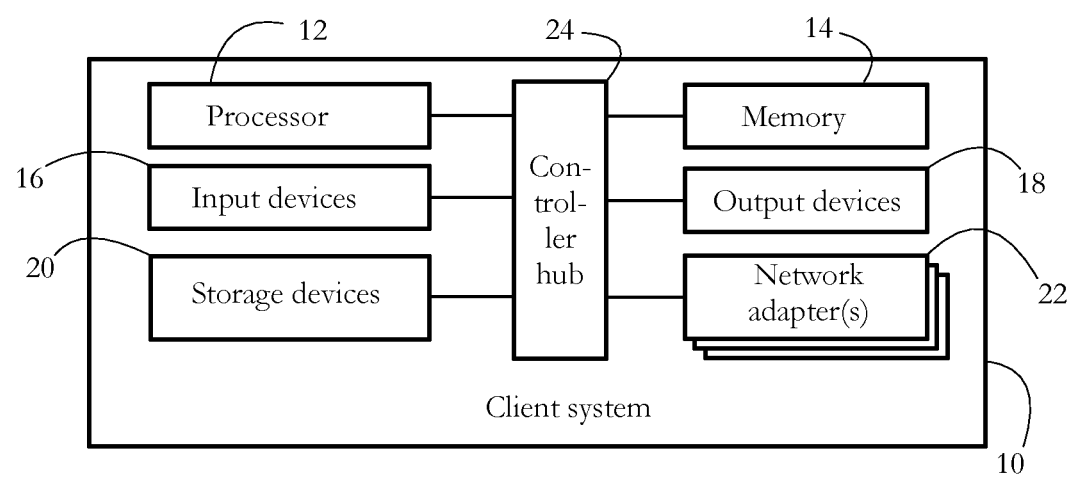
FIG. 2 illustrates an exemplary hardware configuration of a client computer system according to some embodiments of the present invention.

FIG. 2 illustrates an exemplary hardware configuration of client system 10, wherein client system 10 is a computer system. A skilled artisan will appreciate that the hardware configuration of other devices such as tablet PCs, mobile telephones, smartwatches, etc., may differ from the illustrated configuration, but that the present description may be adapted to such devices. Client system 10 comprises a set of physical devices, including a hardware processor 12, a memory unit 14, a set of input devices 16, a set of output devices 18, a set of storage devices 20, and a set of network adapters 22, all inter-connected by a controller hub 24.

In some embodiments, processor 12 comprises a physical device (e.g. microprocessor, multi-core integrated circuit formed on a semiconductor substrate) configured to execute computational and/or logical operations with a set of signals and/or data. In some embodiments, such logical operations are transmitted to processor 12 from memory unit 14, in the form of a sequence of processor instructions (e.g. machine code or other type of software). Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into client system 10. Output devices 18 may include display devices such as monitors and speakers, among others, as well as hardware interfaces/adapters such as graphic cards, allowing client system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables client system 10 to connect to a network (e.g., a local area network, wireless network, etc.) and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 24 may comprise a northbridge connecting processor 12 to memory 14, and/or a southbridge connecting processor 12 to devices 16, 18, 20 and 22.

Figure 3:
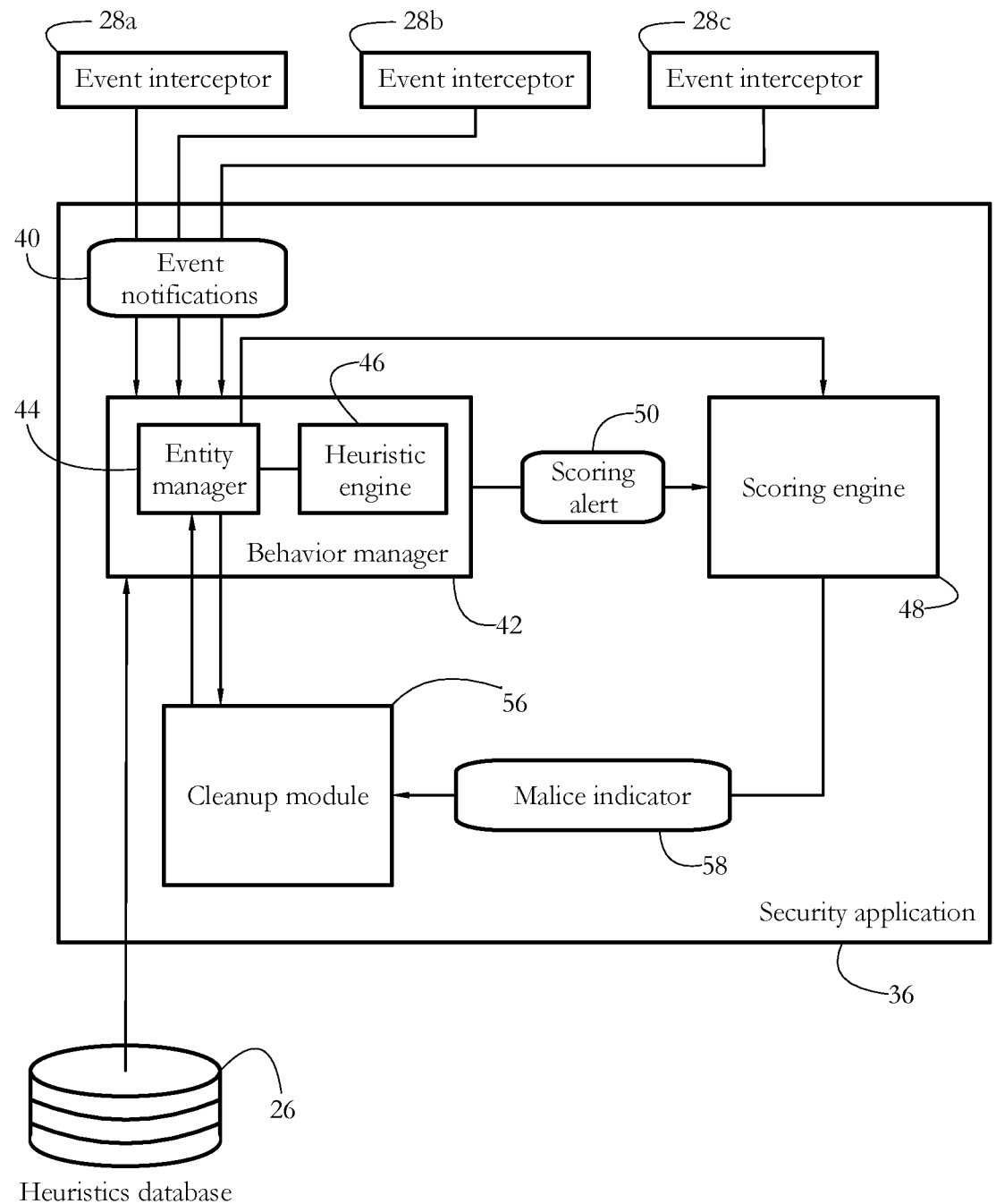
FIG. 3 shows an exemplary structure of a security application according to some embodiments of the present invention.

FIG. 3 shows exemplary components of a security application 36 according to some embodiments of the present invention. Security application 36 comprises a scoring engine 48 and a cleanup module 56, both connected to a behavior manager 42. Behavior manager 42 further comprises an entity manager 44 coupled to a heuristic engine 46.

In some embodiments, behavior manager 42 receives a set of event notifications 40 from a set of event interceptors 28a-c installed within various software objects executing on client system 10. Event notifications 40 may thus inform behavior manager 42 about the occurrence of various events during execution of software. Exemplary notified events may include, among others, the creation of a process or thread, code injection, a system call, an attempt to create a new disk file, an attempt to write to an existing disk file, an attempt to edit a system register key, and an attempt to write to a particular memory section. Some of the notified events may be malware-indicative. Other events may not be themselves indicative of a security threat, but may signal a potential threat when occurring together with other events. In response to receiving notification(s) 40, some embodiments of behavior manager 42 may access heuristics database 26 and select detection routines according to details of notification(s) 40, the selected routines implementing particular heuristic(s). Behavior manager 42 may further send the respective detection routines to heuristic engine 46 for execution. Execution of the respective routines may supply a scoring alert 50 to scoring engine 48. Engine 48 may maintain a plurality of such assessment indicators (e.g., scores), and may raise an alert when at least one such indicator indicates a computer security threat. The operation of components 44, 46, 48 and 56 is described in detail below.

Figure 4:
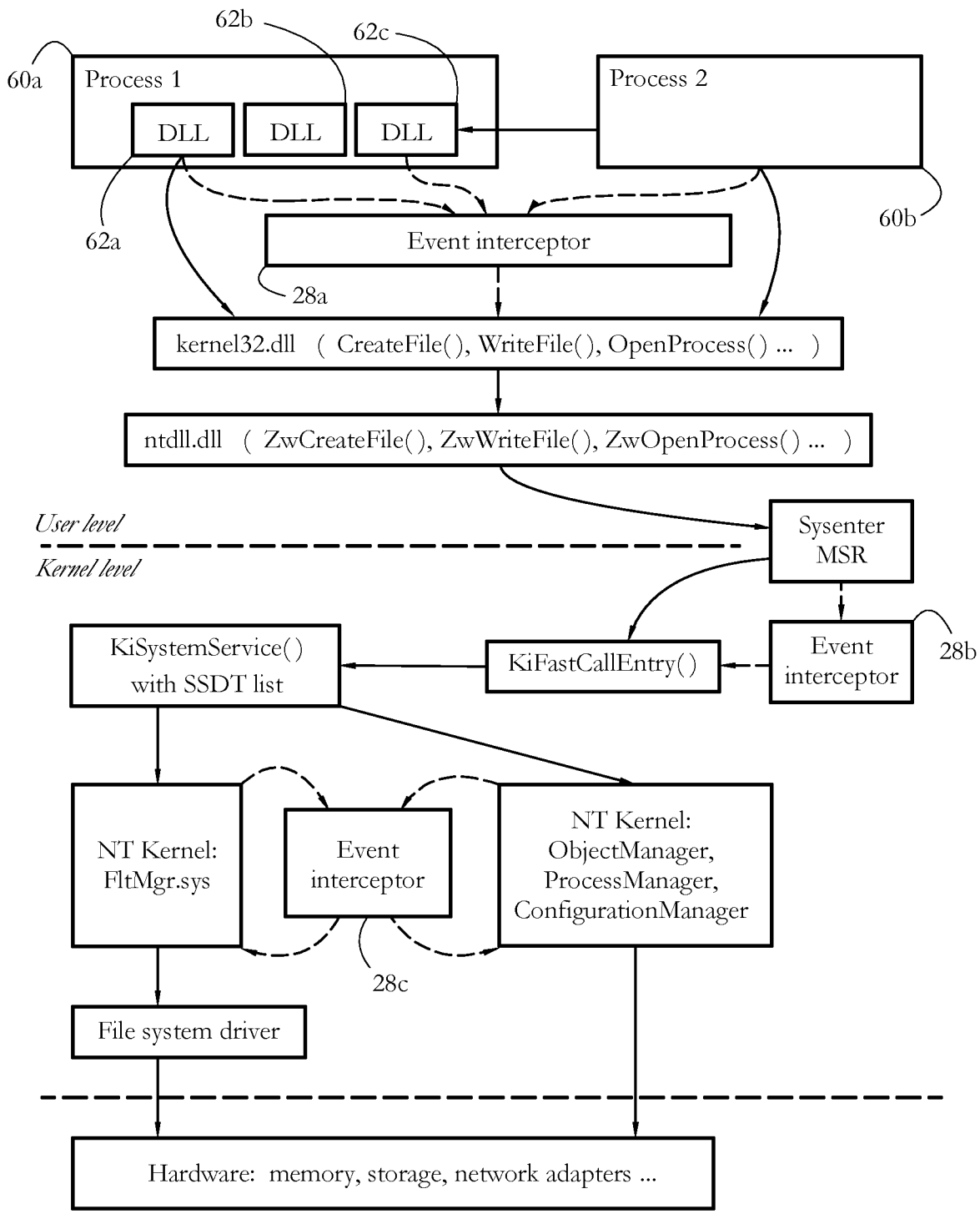
FIG. 4 illustrates an exemplary execution flow of a set of processes in a Windows® environment. Solid arrows indicate the typical flow in the absence of the security application. Dashed arrows indicate modifications to the execution flow, the modifications introduced by a plurality of event interceptors operating according to some embodiments of the present invention.

To illustrate the operation of event interceptors 28a-c, FIG. 4 shows an exemplary execution flow of a set of software entities 60a-b according to some embodiments of the present invention. For simplicity, the chosen entities 60a-b are processes executing in an instance of a Windows® OS; similar diagrams may be rendered for other operating systems such as Linux, for example. Solid arrows represent the execution flow in the absence of event interceptors. Dashed arrows represent modifications to the flow due to the presence of event interceptors 28a-c executing according to some embodiments of the present invention.

Exemplary process 60a loads a plurality of dynamic-linked libraries (DLLs) 62a-c; in the example of FIG. 4, DLL 62c is injected into process 60a by (possibly malicious) process 60b. When process 60a (or one of its loaded DLLs) executes an instruction calling for some system functionality, e.g. to write something to a disk file, or to edit a registry key, the respective instruction calls a user-mode application programming interface (API) such as KERNEL32.DLL or NTDLL.DLL. In the example of FIG. 4, the respective user-mode API call is intercepted by a user-level event interceptor 28a. Such interceptions may be achieved by a method such as DLL injection or hooking, among others. Hooking is a generic term used in the art for a method of intercepting function calls, messages, or events passed between software components. One exemplary hooking method comprises altering the entry point of a target function, by inserting an instruction (in this case, event interceptor 28a) redirecting execution to a second function. Following such hooking, the second function may be executed instead, or before, the target function. In the example of FIG. 4, security application 36 may hook into certain functions of the KERNEL32.DLL and/or NTDLL.DLL libraries, to instruct the respective functions to redirect execution to a component of application 36. Thus, application 36 may be notified whenever process 60a is attempting to perform a particular action, identified according to the hooked function.

In a typical flow of execution, the user-mode API function called by entity 60a may request service from the operating system's kernel. In some embodiments, such operations are carried out by issuing a system call, such as SYSCALL and SYSENTER on x86 platforms. In the example of FIG. 4, such system calls are intercepted by event interceptor 28b. In some embodiments, such interception comprises, for instance, modifying a system call handler routine by changing a value stored in a model-specific register (MSR) of processor 12, which effectively redirects execution of the respective handler routine to interceptor 28b or directly to a component of application 36. Such techniques are known in the art as MSR hooking, and may allow security application 36 to be notified whenever a software entity is attempting to perform certain system calls.

Following the system call, control of the processor is typically turned over to the kernel of OS 30. In some embodiments, a kernel-level event interceptor 28c is configured to intercept certain actions of the OS kernel, and therefore determine that the evaluated process is attempting to perform certain operations, which may be malware-indicative. To intercept such actions, some embodiments may employ a set of filtering mechanisms built into and exposed by OS 30. For example, in a Windows® OS, FltRegisterFilter may be used to intercept operations like creating, opening, writing to, and deleting a file. In another example, event interceptor 28c may use ObRegisterCallback to intercept create or duplicate object-handle operations, or PsSetCreateProcessNotifyRoutine to intercept the creation of new processes. In yet another example, Windows registry operations such as creating and setting registry keys/values may be intercepted using CmRegisterCallbackEx. Similar event filtering mechanisms are known in the art for other operating systems such as Linux®. In response to detecting the occurrence of a particular event/action, event interceptor 28 may transmit notification(s) 40 to security application 36.

In some embodiments, security application 36 monitors a plurality of software entities for malicious behavior. Monitored software entities may vary in complexity from individual execution threads, to processes, to whole applications, frameworks, and virtual machines. For simplicity, the following presentation will assume that monitored entities are processes, but this assumption should not limit the scope of the present invention. A skilled artisan will appreciate that the described systems and methods may be extended to other types of executable entities beside individual processes.

Some embodiments of the present invention divide executable entities (e.g. processes) into several distinct categories from the perspective of monitoring malicious behavior. Such categories may include, among others, group creators, group inheritors, and unmonitored entities. In some embodiments, group creators include certain processes, components, and services of the operating system, such as Winlogon and Service Host (svchost.exe) in Windows®. Other group creator entities may include, among others, file manager processes and/or components (e.g. Windows Explorer®, File Explorer®, Total Commander®, etc.), and or browser processes and components (e.g. Internet Explorer®, Firefox®, Chrome®, etc.). The group inheritor category may include the majority of user processes, as well as unknown entities or entities which cannot be identified as group creators. A further category may represent entities which are exempt from monitoring. Such non-monitored entities may include, for instance, certain processes protected by the operating system (e.g., csrss.exe and smss.exe on Windows® platforms), and entities forming part of security application 36. In some embodiments, an entity's category may change during its lifetime. For instance, a group creator entity may become a group inheritor, as shown below.

Some embodiments of security application 36 may determine which category each entity belongs to according to certain features of the respective entity, such as a path, a filename, a set of resources (e.g., libraries loaded at launch), an OS registry entry, a digital signature, and a memory location of the respective entity. Other data indicative of whether an entity belongs to a particular category comprises an indicator of whether the respective entity uses certain hardware devices (e.g., network adapters 22). In an exemplary embodiment, security application may perform an audit of client system 10 and/or of OS 30 to locate a set of resources associated to group creator entities such as OS services, browsers, and file managers, and later use such information to determine whether an executing entity belongs to one category or another. Security application 36 may further identify an entity and establish its category by comparing a set of hashes of the respective entity to a database of hashes of known entities.

In some embodiments, entity manager 44 maintains a data structure (e.g., a list) of entities executing on client system 10, and dynamically updates the respective data structure to reflect addition of new entities (e.g., in response to process creation) and removal of other entities (e.g., in response to process termination). For simplicity, entities currently on the list of executing entities are hereinafter deemed current entities. In some embodiments, each entity on the list of current entities represents a distinct instance of an executable object. The list of current entities may therefore comprise multiple instances of the same executable object. In one such example wherein a web browser application executes each browser tab as a separate process, each such process may be a separate monitored entity.

Entity manager 44 further divides current entities into a plurality of groups, each group comprising only mutually related entities, and maintains a set of associations indicating, for instance, which entity is part of which group. Entities may be related via filiation and/or code injection, among others. Filiation herein refers to one entity of the group being a child or a parent of another entity. Child processes may be created, for instance, via spawning (in Windows®) or forking (in Unix-derived OSs). In some embodiments, the same entity may belong simultaneously to a plurality of distinct groups. In one such example, an entity is part of a first group because it is either the child or parent of another member of the first group, and at the same time is part of a second group because another member of the second group has injected code into it.

FIGS. 5-A-B illustrate various exemplary entity groups maintained by entity manager 44 according to some embodiments of the present invention. The illustrations use triangles to denote group creator entities, circles to denote group inheritor entities, and squares to denote non-monitored entities. Solid arrows indicate filiation, whereas dashed arrows indicate code injection. The direction of each arrow may indicate a direction of the relationship between the respective connected entities. For instance, in FIG. 5-A, entity $E_6$ is a child of entity $E_5$, while entity $E_7$ has injected code into entity $E_{14}$.

Group creators may or may not belong to a group. Some embodiments assign a distinct group to each group creator entity (e.g., groups like $G_1$ and $G_6$ in FIG. 5-A). Such groups may have only one member, i.e., the respective group creator entity. In some embodiments, group creators create new groups when they spawn new entities. In the example of FIG. 5-A, group creator $E_1$ creates group $G_5$ when it spawns child entity $E_5$. In some embodiments, when a group inheritor entity spawns another entity or injects code into another entity, the other entity is included in the same group as the group inheritor entity. In the example of FIG. 5-A, entity $E_6$ is included in the same group as its parent entity $E_5$. Similarly, entity $E_{14}$ is included in the same group as entity $E_7$ in response to receiving injected code from $E_7$.

In some embodiments, an entity's category may change in response to certain events and/or in response to becoming part of a group. In the example of FIG. 5-A, entity $E_{14}$ was initially a group creator entity (see group $G_{11}$). Later, in response to receiving injected code from a member of group $G_5$, entity $E_{14}$ became part of group $G_5$ and was re-marked as a group inheritor. The same treatment may apply to entity $E_1$ in FIG. 5-B.

An entity may simultaneously belong to multiple groups. In the example of FIG. 5-B, entity $E_5$ (a group inheritor) is simultaneously a member of groups $G_3$, $G_5$, and $G_6$. $E_5$ is part of $G_3$ as being a recipient of injected code from entity $E_3$. Similarly, $E_5$ is part of $G_6$ because $E_5$ received injected code from $E_6$. Entity $E_5$ is further part of group $G_5$ because it was spawned by group creator $E_2$. When entity $E_5$ spawns child entity $E_9$, $E_9$ becomes a member of both groups $G_3$ and $G_5$. Similarly, in FIG. 5-A, when entity $E_{14}$ (now a group inheritor, see discussion above) spawns a new entity $E_{15}$, entity $E_{15}$ may be included in both groups $G_5$ and $G_{11}$.

Figure 6:
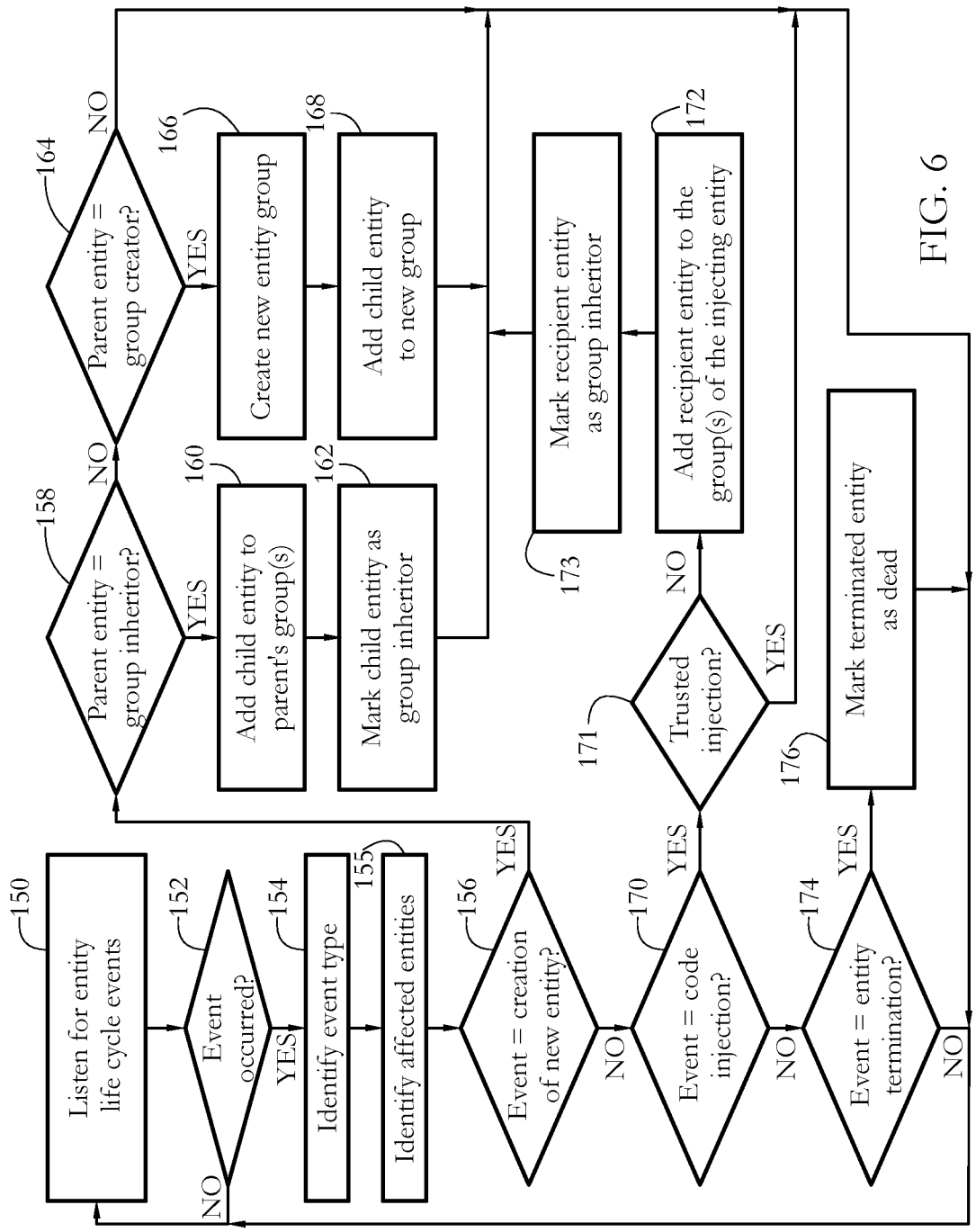
FIG. 6 shows an exemplary sequence of steps performed by the entity manager (FIG. 3) according to some embodiments of the present invention.

FIG. 6 shows an exemplary sequence of steps performed by entity manager 44 (FIG. 3) to manage the list of current entities according to some embodiments of the present invention. In a sequence of steps 150-152, entity manager 44 intercepts an entity life-cycle event, and when such an event has occurred, the sequence of steps 154-155 identifies a type of the event and the affected entities. In some embodiments, lifecycle events comprise process creation, code injection, and process termination, among others. Detecting such events may comprise receiving event notification(s) 40 from an appropriate event interceptor, for instance interceptor 28c in FIG. 4. Entity manager 44 may identify entities affected by the current lifecycle event (e.g., the parent and child process, in the case of spawning) by parsing a data structure used by OS 30 to manage processes currently in execution. In the Windows® OS, each process is represented as an executive process block (EPROCESS), which comprises, among others, handles to each of the threads of the respective process, and a unique process ID allowing OS 30 to identify the respective process from a plurality of executing processes. Similar process/thread representations are available for other OSs, such as Linux.

A step 156 determines whether the event comprises a creation of a new entity (e.g. a new process), and when no, entity manager 44 advances to a step 170 described below. When the event comprises entity creation, in a step 158, manager 44 determines whether the parent entity is a group inheritor, and when no, manager 44 advances to a step 164. When yes, in a sequence of steps 160-162, manager 44 may add the child entity to the group(s) of the parent entity and mark the child entity as a group inheritor. In step 164, manager 44 determines whether the parent entity is a group creator. When yes, in a sequence of steps 166-168, manager 44 may create a new group and add the child entity to the newly created group.

In some embodiments, step 170 determines whether the detected lifecycle event comprises an injection of code, and when no, manager 44 may advance to a step 174. As a general rule, security application 36 may interpret each code injection-event as suspect, possibly indicating malicious activities. However, some entities of the OS legitimately inject code into other entities, in very specific situations. Such situations are commonly known in the security community as exceptions, and are typically exempted from anti-malware processing in order not to accidentally generate a false-positive detection. In some embodiments, a step 171 checks whether the injection can be trusted to be legitimate, for instance by attempting to match details of the respective injection event to a list of exceptions. When the respective code injection is not recognized as a known kind of legitimate injection, in a step 172 manager 44 may add the entity receiving the injected code to the group(s) of the entity performing the code injection. In some embodiments, a further step 173 marks the recipient entity as a group inheritor.

In step 174, manager 44 determines whether the event comprises the termination of an entity, and when no, manager 44 returns to step 150. For instance, a process is terminated when all the threads of the respective process have finished execution. Some embodiments may keep a terminated entity as part of a group, for instance until all its children entities are terminated, or until all members of the respective group are terminated. In such embodiments, the terminated entity may be marked as dead (step 176). This strategy may allow cleaning client system 10 of the effects of evasive malware, for instance of the effects of an entity which spawns malicious children and then quits. In other embodiments, when the detected lifecycle event comprises entity termination, manager 44 may remove the terminated entity from all groups.

In some embodiments, heuristic engine 46 (FIG. 3) performs a set of tests or procedures, herein generically called heuristics, to determine whether the occurrence of a set of events within client system 10 is indicative of a security threat, e.g., is malware-indicative. When the respective heuristic(s) conclude(s) that the set of events is malware-indicative, engine 46 may transmit a scoring alert 50 to scoring engine 48, which may further determine whether client system 10 comprises malware. Heuristic engine 46 is notified of the occurrence of an event by event interceptors 28a-c.

Some heuristics may be entity-related, in the sense that they determine whether the occurrence of an event is indicative of an individual entity being malicious. Such heuristics will be herein referred to as entity heuristics. Other heuristics may be group-related (and herein called group heuristics), in the sense that they determine whether the occurrence of an event is indicative of a whole entity group being malicious.

Each heuristic may embody a distinct malware detection method. In some embodiments, each heuristic may be configured to detect the presence of a particular category, family, type, or variant of malicious agent. Several distinct heuristics may collaborate in detecting a single category, family, type, or variant of malicious agent. In some embodiments, a single heuristic may participate in detecting several categories, types, families, or variants of malware. A particular example of heuristic checks for the occurrence of a particular sequence of events (a behavioral signature) on client system 10. Not all events of the sequence need to be caused by the same entity. However, the occurrence of such a sequence of events may be malware-indicative. In one such example, illustrated in FIG. 7, malicious activities are divided among a group of entities $E_1$-$E_4$, each member of the group carrying out a small part of the malicious activities. The particular sequence of actions $A_1$-$A_6$ amounts to a behavioral signature 68 identifying a particular malware attack.

FIG. 7 illustrates an exemplary behavior signature associated with a ransomware attack. Ransomware is a particular type of malware, which encrypts a set of files on a user's computer, and then asks the user to pay in order to recover the respective files. Entity creation is illustrated as a zig-zagged arrow. Each solid vertical line shows the life history of each entity. For instance, entity $E_1$ dies after spawning entity $E_2$. Entity $E_3$ became part of the illustrated group in response to receiving injected code from $E_2$. Some actions of the respective entities are not part of signature 68. For instance, entity $E_3$'s spawning of entity $E_4$ is not included in signature 68.

FIGS. 8A-B illustrate such exemplary behavioral signatures. Signature 68*a* requires that actions $A_1$-$A_6$ be carried out in the exact indicated order. In contrast, exemplary signature 68*b* allows that some actions ($A_3$, $A_4$, and $A_5$) be performed in any order, as long as they happen in between $A_2$ and $A_6$. The flexibility afforded by signatures such as 68*b* may allow detecting various versions, variants, or a whole family of malicious agents. In some embodiments, a heuristic that uses a particular behavioral signature is configured to detect the occurrence of the particular sequence of events (or actions) indicated by the respective behavioral signature. The respective heuristic may further verify the relationships between entities performing the actions (e.g., may verify that all participating entities are part of the same group). In some embodiments, such verifications are implicit. For example, a group heuristic configured to implement a particular behavioral signature may be initialized once for a selected entity group. The respective group heuristic may then be triggered only when a member of the respective group performs an action. Further discussion and examples of group heuristics are given below.

In some embodiments, heuristic engine 46 interfaces with a heuristics database 26, which may reside on storage devices 20 of client system 10, or on computer-readable media communicatively coupled to client system 10. Database 26 may comprise a collection of available heuristics and an indicator of an association between heuristics and the types of events that trigger the use of the respective heuristics. Such associations allow heuristic engine 46 to selectively retrieve a heuristic in response to being notified of the occurrence of an event of a particular type. An exemplary embodiment of database 26 is a software library, e.g., a DLL.

In some embodiments, heuristics are coded in bytecode (a cross-platform instruction set). Examples of bytecode include the Java® and Lua® programming languages. Each heuristic may be coded and delivered as a separate bytecode routine. In such embodiments, heuristic engine 46 may include a bytecode translation virtual machine (for instance an interpreter or a just-in-time compiler) that translates bytecode into a sequence of native processor instructions and executes the respective sequence. Such embodiments may facilitate development and substantially shorten the time-to-market of security application 36.

Figure 9:
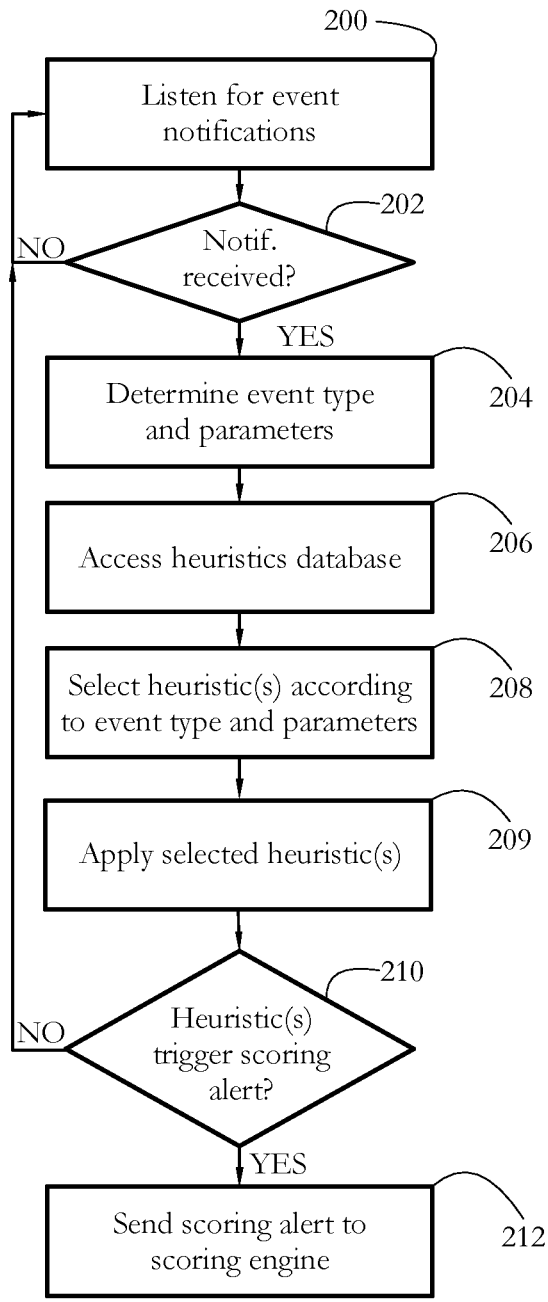
FIG. 9 illustrates an exemplary sequence of steps performed by the heuristic engine (FIG. 3) according to some embodiments of the present invention.

FIG. 9 illustrates an exemplary sequence of steps performed by heuristic engine 46, according to some embodiments of the present invention. A sequence of steps 200-202 listens for event notifications from interceptors 28*a-c*. In response to receiving event notification 40, a step 204 determines a type and a set of event parameters of the respective notified event. Exemplary event types include, among others, code injection, a particular system call, creation of a disk file, and a HTTP request. Event parameters may be specific to each type of notified event. Some exemplary event parameters include, among others, an identifier of a process or thread (e.g., process ID) performing the notified action, a filename, a path, a memory address, and an operand of a processor instruction. Event parameters may be determined by interceptors 28*a-c* and included in event notification(s) 40, or may be determined by heuristic engine 46 in response to receiving notification(s) 40. In one example wherein the notified event is an attempt to create a new disk file, event parameters may include the name of the file being created. The respective filename may be determined by the event interceptor and transmitted to heuristic engine 46 as part of notification 40. In some embodiments, event parameters include a timestamp indicating the moment in time when the respective event occurred or was detected. Timestamps may be further used by heuristic engine 46 to determine whether certain events occur in sequence (see, e.g., description above in relation to behavioral signatures).

In a sequence of steps 206-208, engine 46 may access heuristics database 26 and selectively retrieve a set of heuristics according to the type and parameters of the notified event. A further step 209 applies the selected heuristic(s) to determine whether the notified event is indicative of malware. When the respective heuristic(s) indicate a suspicion of malice, in a step 212, engine 46 sends a scoring alert 50 to scoring engine 48. Scoring alert 50 may include an identifier of the respective heuristic(s), and may further include an identifier of a suspect entity and/or group.

Some embodiments of heuristic engine 46 operate with several distinct types of variables, such as LOCAL, STATIC, ENTITY, GROUP, and GLOBAL, among others. LOCAL-type variables may be unique to the each instance of a heuristic. STATIC-type variables may be specific to each heuristic, in the sense that their value may be shared across multiple instances of the same heuristic. GLOBAL-type variables may be shared across all heuristics and instances thereof. ENTITY-type variables may be uniquely attached to a <heuristic, entity> tuple, shared across multiple instances of the same heuristic, but differing from one entity to another. ENTITY-type variables may be initialized once for every monitored entity, and erased upon termination of the respective entity. GROUP-type variables may be uniquely attached to a <heuristic, group> tuple, shared across multiple instances of the same heuristic, but differing from one entity group to another. GROUP-type variables may be initialized once for every group of entities. Such embodiments allow certain heuristics to check, for instance, for complex behavioral signatures wherein malicious activities are distributed across multiple entities.

In some embodiments, scoring engine 48 maintains and updates a plurality of maliciousness scores determined for a plurality of monitored entities and/or groups of entities executing on client system 10. Scoring engine 48 may further determine whether client system 10 comprises malicious software according to the respective scores. In some embodiments, scoring engine 48 receives scoring alert 50 from heuristic engine 46 when engine 46 determines that the occurrence of a particular event is indicative of malice. In response to detecting malware, scoring engine 48 may further send a malice indicator 58 to cleanup module 56.

FIG. 10-A shows a plurality of exemplary entity scoring objects (ESO) 74*a-c*, each ESO determined by scoring engine 48 for a respective software entity 70*a-c*, according to some embodiments of the present invention. Each ESO may comprise a plurality of data fields, some of which are illustrated in FIG. 10-A. Such fields include a unique entity identifier EID 76*a*, a plurality of current entity evaluation scores 76*b*, and a current entity aggregate score 76*d*. In some embodiments, entity evaluation scores 76*b* are determined by engine 48 according to scoring alerts 50 received from heuristic engine 46. Each score 76*b* may be determined according to a distinct criterion. For instance, scores 76b may have a one-to-one correspondence with a set of heuristics 76c, so that each entity evaluation score is attributed according to the respective heuristic. In one such example, a particular heuristic $H_k$ comprises determining whether a monitored entity downloads a file from a computer network such as the Internet. The respective score $S_k$ may then be awarded or increased only when the respective evaluated entity attempts a download. In some embodiments, entity aggregate score 76d is calculated as a sum of current entity evaluation scores 76b (see further details below).

In some embodiments, each ESO may further include an indicator of an association between the respective entity and the groups to which it belongs. For instance, in the example of FIG. 10-A, item 76f illustrates such a list of entity groups. In an alternative embodiment, scoring engine 48 may dynamically retrieve a list of groups having a certain entity as a member from entity manager 44.

Some embodiments of scoring engine 48 further maintain a set of scores associated with each entity group. FIG. 10-B shows a plurality of exemplary group scoring objects (GSO) 75a-c, each GSO determined for a distinct group of software entities. Each illustrated GSO comprises a unique group identifier GID 77a, a plurality of current group evaluation scores 77b, and a current group aggregate score 77d (the superscript G indicates that the respective items are associated with a group of entities as opposed to a single entity). In some embodiments, each group evaluation score is awarded and/or incremented according to a distinct criterion (e.g., a distinct heuristic). An exemplary heuristic that sets and/or increments group evaluation scores implements a behavioral signature as illustrated in FIG. 7. Using that example, a group evaluation score corresponding to the group comprising entities $E_1$, $E_2$ and $E_3$ may be incremented when entities $E_1$, $E_2$ and $E_3$ perform actions $A_1$-$A_6$ in the illustrated order. Group heuristics corresponding to each group evaluation score are illustrated as items 77c in FIG. 10-B.

In some embodiments, each GSO may further comprise an indicator of an association between the respective group and its member entities. In the example of FIG. 10-B, entities $E_1^{(G1)}$, $E_2^{(G1)}$, etc., are members of group $G_1$. Alternatively, scoring engine 48 may request group membership data from entity manager 44 at any time. In some embodiments, group aggregate score 77d is computed by summing group evaluation scores 77b, as detailed further below.

Some embodiments of scoring engine 48 increase each entity and/or group evaluation score by an amount specific to the heuristic corresponding to the respective score. FIGS. 11-A-B show such score increments, corresponding to entity scores and group scores, respectively. When scoring engine 48 receives a scoring alert 50 generated in response to executing a particular heuristic, the entity and/or group evaluation score corresponding to the respective heuristic may be increased by the respective increment value. Some entity heuristics may also be group heuristics, for instance heuristic $H_1$ may coincide with group heuristic $H_1^{(G)}$. In some embodiments, a scoring alert generated by such a heuristic may result in updating an entity evaluation score of the respective entity and/or a group evaluation score of a group having the respective entity as a member.

FIG. 12-A shows an exemplary sequence of steps performed by scoring engine 48 (FIG. 3) according to some embodiments of the present invention. A sequence of steps 300-302 listens for scoring alerts from heuristic engine 46. In some embodiments, scoring alert 50 includes an indicator of a heuristic that generated the respective alert, and an indicator of an entity and/or a group of entities for which the respective alert was generated. In response to receiving scoring alert 50, a step 304 determines whether alert 50 was generated by an entity heuristic (i.e., a heuristic configured to determine whether an event is indicative of an individual entity being malicious). When no, scoring engine 48 advances to a step 310. When yes, in a step 306, scoring engine 48 identifies the respective entity according to alert 50 and updates the evaluation score(s) of the respective entity according to the heuristic(s) that generated the alert. For example, when alert 50 was generated by heuristic $H_k$, scoring engine 48 may increase score $S_k$ corresponding to heuristic $H_k$ by an appropriate increment (see e.g. FIG. 11-A). A further step 308 computes the aggregate score of respective entity, for instance by summing all entity evaluation scores of the respective entity.

Step 310 determines whether scoring alert 50 was generated by a group heuristic (i.e., a heuristic configured to determine whether an event is indicative of a group of entities being malicious). When no, scoring engine 48 advances to a step 316. When yes, in a step 312, scoring engine 48 identifies a set of groups according to alert 50 and updates a group evaluation score of the respective group(s) according to the heuristic(s) that generated the alert. In step 314, engine 48 computes an aggregate score of respective group(s), for instance as a sum of group evaluation scores.

In step 316, scoring engine 48 determines whether the aggregate score of the respective entity and/or group exceeds a predetermined threshold. When no, engine 48 returns to step 300. When yes, engine 48 sends malice indicator 58 to cleanup module 56.

FIG. 12-B shows an alternative sequence of steps performed by scoring engine 48. In response to receiving alert 50, a step 326 identifies an entity and a heuristic generating the respective alert. Then, evaluation and aggregate score(s) are determined for the respective entity according to alert 50. In a step 332, scoring engine 48 identifies at least one group having the respective entity as a member. A step 336 then increments the aggregate score of the respective group. When the aggregate score of either entity or group (or both) exceed a predetermined threshold, a step 340 sends malice indicator 58 to cleanup module 56. The exemplary embodiment illustrated in FIG. 12-B may increment a group score every time a member of the respective group performs a malware-indicative action. Therefore, even when malicious activities are divided between several members of the group, and when aggregate scores corresponding to each individual member are not enough to indicate malice, the group-wide score may exceed the malware detection threshold.

FIG. 12-C shows yet another exemplary alternative sequence of steps performed by scoring engine 48 according to some embodiments of the present invention. In contrast to FIGS. 12-A-B, FIG. 12-C may describe the operation of an embodiment that does not calculate group scores, relying instead exclusively on entity scores. However, such an embodiment may still detect evasive malware by using group heuristics. Using the example of behavior signature 68 in FIG. 7, a heuristic detecting the occurrence of the sequence of events $A_1$-$A_6$ may generate scoring alert 50 in response to detecting that entity $E_4$ has performed action $A_6$, and thus completing the malware-indicative sequence of actions indicated by behavioral signature 68. In response to receiving such an alert, step 348 may increment the entity evaluation score of entity $E_4$, the score corresponding to the respective heuristic. If the increment associated to the respective heuristic is chosen to be large enough, the increase of the respective entity evaluation score may be large enough so that the aggregate score computed for entity $E_4$ exceeds the malware detection threshold.

Figure 13:
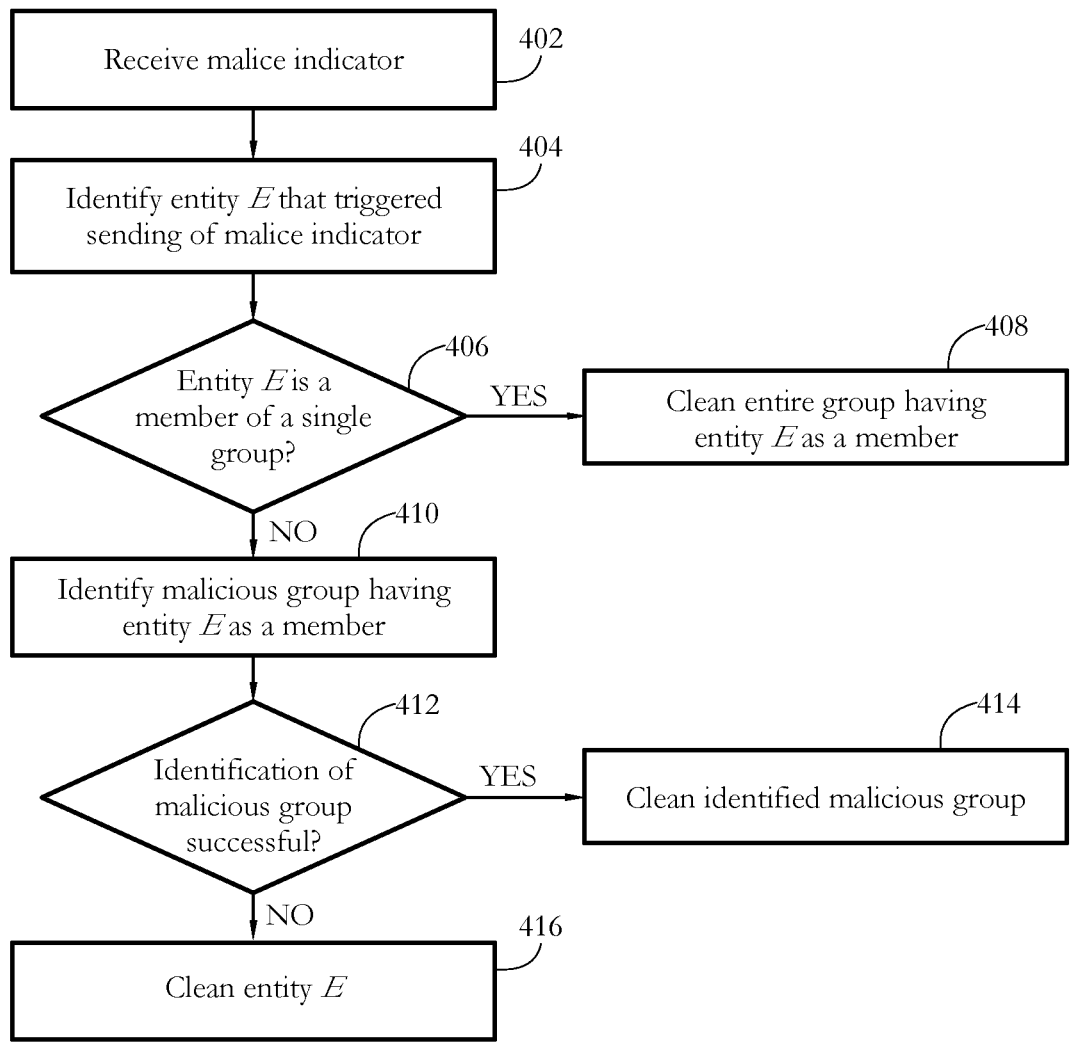
FIG. 13 illustrates an exemplary sequence of steps performed by the cleanup module (FIG. 3) according to some embodiments of the present invention.

FIG. 13 illustrates an exemplary sequence of steps performed by cleanup module 56 (FIG. 3), according to some embodiments of the present invention. In a step 402, module 56 receives malice indicator 58 from scoring engine 48. In some embodiments, malice indicator 58 includes an indicator of a suspect entity and/or an indicator of a suspect entity group, e.g., entities and/or groups whose aggregate scores exceeded malware detection thresholds (see above). In a step 404, module 56 identifies the suspect entity that triggered scoring engine 48 into sending malice indicator 58.

In some embodiments, a step 406 checks whether the respective suspect entity is a member of a single group. When no, module 56 advances to step 410. When yes, in step 408, cleanup module 56 cleans the entire group of the suspect entity. In some embodiments, cleaning an entity group comprises cleaning every member entity of the respective group. Cleanup may involve any method known in the art of computer security. In some embodiments, cleaning an entity comprises suspending or terminating execution of the respective entity. Cleaning the entity may further comprise deleting a disk file comprising code of the respective entity. Cleaning the entity may further comprise undoing or rolling back a set of changes performed by the respective entity during its lifetime (such changes may include changes to a registry of the OS, to the file system, etc.). Cleaning the entity may comprise analyzing the respective entity using an additional, separate malware scanner. In some embodiments, cleanup further includes alerting a user of client system 10 and/or a system administrator.

In one example of cleaning, when malicious activities have been tracked down to a code injection event, cleanup module 56 terminates the recipient entity and rolls back all changes to memory and/or the file system that occurred after the respective injection event. When possible, cleanup module 56 may roll back only changes produced as a result of the respective injection event. In another example of cleaning, when a malicious entity uses a clean entity (such as cmd.exe, regedit.exe, a legitimate browser process, etc.) to carry out part of a malicious attack, cleanup module 56 may terminate the respective clean entity, but not delete its executable files.

In some embodiments, when the suspect entity belongs to multiple entity groups, step 410 attempts to identify which of the respective groups may be malicious. Step 410 may include determining how the suspect entity became a member of each respective group (e.g., in response to entity creation vs. code injection). Step 410 may further determine which heuristic triggered the scoring alert that determined scoring engine to conclude that client system 10 was under attack. Identifying the heuristic triggering malware detection may allow determining what action the suspect entity was performing, which triggered the respective scoring alert. To carry out step 410, cleanup module 58 may further determine which component of the suspect entity was executing when the respective scoring alert was triggered.

In one exemplary scenario, the suspect entity became a member of a first group via entity creation and a member of a second group via code injection. Step 410 has determined that the scoring alert causing malware detection was triggered while code from the main executable module of the suspect entity was executing. Then, cleanup module 58 may conclude that the first group is malicious. In contrast, had the suspect entity been executing the injected code at the time the scoring alert was triggered, cleanup module 58 may have concluded that the second group was malicious.

In a step 412, module 56 determines whether the identification of the malicious group was successful. When yes, in step 414, module 56 cleans the identified malicious group. When step 410 could not identify a malicious group of entities, in a step 416, module 56 cleans only the suspect entity. Step 416 may thus prevent false positive malware identification, i.e., falsely identifying a benign entity as being malicious, which may lead to data loss for the user.

The exemplary systems and methods described above allow protecting a computer system from malicious software, such as viruses, Trojans and spyware. In some embodiments of the present invention, a security application monitors the behavior of a set of entities (e.g., processes) currently executing on the client system. The security application is notified by a set of event interceptors of the occurrence of various events within the client system. Such exemplary events may include, among others, the creation of a process or thread, code injection, a system call, an attempt to create a new disk file, an attempt to write to an existing disk file, an attempt to edit a OS registry key, and an attempt to write to a particular memory section. Some of the notified events may be malware-indicative, while other events may not be themselves indicative of a security threat, but may signal a potential threat when occurring together with other events.

In response to receiving event notifications, the security application may execute a set of detection procedures (e.g., heuristics) to determine whether the respective events are indicative of malware. In response to determining that an event is malware-indicative, a heuristic may cause a malware-indicative score to be incremented. A scoring engine may further determine whether the client system is under attack according to the incremented malware-indicative score. A cleanup module may further take anti-malware action against entities or groups of entities considered to be malicious.

Conventional anti-malware systems typically associate a score to each individual entity, and increment such scores whenever the respective entities behave in a malware-indicative manner. Such conventional systems typically fail to detect evasive malware, which divides malicious activities among a plurality of entities. When the behavior of each participating entity is not malware-indicative when taken in isolation, such behavior may not lead to detection based on individual scores. In contrast, some embodiments of the present invention explicitly address evasive malware by correlating behaviors across multiple related entities.

In some embodiments, the security application divides monitored entities into a plurality of entity groups, wherein all members of a group are related by filiation or code injection. An entity may simultaneously belong to multiple entity groups. The security application may further associate a set of scores with each entity group. Such group scores may be incremented when a member of the respective group performs certain actions. Thus, even though actions performed by individual members may not be malware-indicative per se, the group score may capture collective malicious behavior and trigger detection.

In some embodiments of the present invention, executable entities are divided in at least two major categories, i.e., group creators and group inheritors. The group creator category may include entities such as operating system processes, file managers and browsers, which may often perform activities such as entity creation in a legitimate manner. In some embodiments, group creator entities create new groups when they spawn child entities. The group inheritor category may comprise user processes and unknown processes. Group inheritor entities may become members of a group of their parent entity, or may be the first entity of a group, when their parent entity is a group creator. Having distinct group membership rules for group creator and inheritor entities allows some embodiments of the present invention to monitor the two categories of entities using distinct malware-detection strategies.

Another manner of addressing evasive malware according to some embodiments of the present invention comprises using malware-detection heuristics which detect a particular sequence or combination of actions performed by a group of related entities, as opposed to isolated actions performed by individual entities. The respective heuristic may trigger a score increase only when all actions of the respective sequence or combination have been performed.

Conventional computer security systems may detect individual malicious entities, and may take anti-malware action against each such entity in isolation from other entities. When the detected malicious entity is a small part of a coordinated network of malicious entities, incapacitating a single entity may still leave the client system vulnerable to, or even infected with malware. In contrast, in response to detecting a group of malicious entities, some embodiments of the present invention may clean up or otherwise incapacitate the whole group of malicious entities. When a suspect entity is part of multiple entity groups, but the security application is unable to determine which of the respective group is carrying out the malicious activities, some embodiments of the present invention take anti-malware action only against the respective suspect entity, to prevent false-positive malware identification.

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one hardware processor and a memory, the at least one hardware processor configured to execute an entity manager and a scoring engine, wherein:
the entity manager is configured to organize a collection of monitored executable software entities into a plurality of entity groups according to inter-entity relations selected from a group of relations consisting of a filiation relation and a code injection relation, wherein at least one entity of the collection simultaneously belongs to more than one entity group of the plurality of entity groups; and
the scoring engine is configured, in response to a detected action of the at least one entity, to:
select a first entity group from the plurality of entity groups based on determining that the at least one entity belongs to the first entity group,
select a second entity group from the plurality of entity groups based on determining that the at least one entity belongs to the second entity group, and
in response to selecting the first and second groups, determine whether the computer system comprises malware according to a first action of a first member of the first entity group, and further according to a second action of a second member of the second entity group, the first and second members distinct from the at least one entity, the first action of the first member distinct from the second action of the second member.

2. The computer system of claim 1, wherein the scoring engine is further configured, in response to the detected action of the at least one entity to:
update a first group score determined by the scoring engine for the first entity group, the first group score indicative of a likelihood that the first entity group is malicious, the first group score determined according to the first action;
update a second group score determined by the scoring engine for the second entity group, the second group score indicative of a likelihood that the second entity group is malicious, the second group score determined according to the second action; and
determine whether the computer system comprises malware according to the updated first and second group scores.

3. The computer system of claim 2, wherein the scoring engine is further configured, in response to the detected action of the at least one entity to:
update an entity score determined by the scoring engine for the at least one entity, the entity score indicative of a likelihood that the at least one entity is malicious; and
determine whether the computer system comprises malware further according to the updated entity score.

4. The computer system of claim 2, wherein the scoring engine is further configured, in response to the detected action of the at least one entity, and in preparation for updating the first and second scores, to:
determine whether the detected action belongs to a predetermined category of actions;
in response, when the detected action belongs to a predetermined category of actions, update the first and second group scores; and
when the detected action does not belong to the predetermined category of actions, update an entity score determined by the scoring engine for the at least one entity, the entity score indicative of a likelihood that the at least one entity is malicious.

5. The computer system of claim 1, wherein organizing the collection comprises:
in response to detecting a creation of the at least one entity by a parent entity of the collection,
adding a new entity group to the plurality of entity groups; and
assigning the at least one entity to the new group.

6. The computer system of claim 5, wherein organizing the collection further comprises, in response to detecting a creation of a child entity by the at least one entity, assigning the child entity to the new group.

7. The computer system of claim 1, wherein organizing the collection comprises:
in response to detecting a code injection event wherein an injector entity of the collection has injected code into the at least one entity, selecting a third entity group from the plurality of entity groups, the third entity group having the injector entity as a member; and
in response, assigning the at least one entity to the third entity group.

8. The computer system of claim 7, wherein organizing the collection further comprises:
in response to detecting the code injection event, selecting a fourth entity group from the plurality of entity groups, the fourth entity group having the injector entity as a member; and
in response, assigning the at least one entity to the fourth entity group.

9. The computer system of claim 1, wherein the scoring engine is configured to determine whether the computer system comprises malware according to an order in which the detected action, first action, and second action have occurred.

10. A method comprising:
employing at least one hardware processor of a computer system to organize a collection of
monitored executable entities into a plurality of entity groups according to inter-entity relations selected from a group of relations consisting of a filiation relation and a code injection relation, wherein at least one entity of the collection simultaneously belongs to more than one entity group of the plurality of entity groups;
employing the at least one hardware processor to detect an action of the at least one entity;
in response to the detected action of the at least one entity, employing the at least one hardware processor to select a first entity group from the plurality of entity groups based on determining that the at least one entity belongs to the first entity group;
in response to the detected action of the at least one entity, select a second entity group from the plurality of entity groups based on determining that the at least one entity belongs to the second entity group; and
in response to selecting the first and second groups, employing the at least one hardware processor to determine whether the computer system comprises malware according to a first action of a first member of the first entity group, and further according to a second action of a second member of the second entity group, the first and second members distinct from the at least one entity, the first action of the first member distinct from the second action of the second member.

11. The method of claim 10, wherein determining whether the computer system comprises malware further comprises, in response to the detected action of the at least one entity:
updating a first group score determined by the scoring engine for the first entity group, the first group score indicative of a likelihood that the first entity group is malicious, the first group score determined according to the first action;
updating a second group score determined by the scoring engine for the second entity group, the second group score indicative of a likelihood that the second entity group is malicious, the second group score determined according to the second action; and
determining whether the computer system comprises malware according to the updated first and second group scores.

12. The method of claim 11, wherein determining whether the computer system comprises malware further comprises, in response to the detected action of the at least one entity:
updating an entity score determined by the scoring engine for the at least one entity, the entity score indicative of a likelihood that the at least one entity is malicious; and
determining whether the computer system comprises malware according to the updated entity score.

13. The method of claim 11, wherein determining whether the computer system comprises malware further comprises, in response to the detected action of the at least one entity, and in preparation for updating the first and second scores:
determining whether the detected action belongs to a pre-determined category of actions;
in response, when the detected action belongs to a pre-determined category of actions, updating the first and second group scores; and
when the detected action does not belong to the pre-determined category of actions, updating an entity score determined by the scoring engine for the at least one entity, the entity score indicative of a likelihood that the at least one entity is malicious.

14. The method of claim 10, wherein organizing the collection comprises:
in response to detecting a creation of the at least one entity by a parent entity of the collection, adding a new entity group to the plurality of entity groups; and
assigning the at least one entity to the new group.

15. The method of claim 14, wherein organizing the collection further comprises, in response to detecting a creation of a child entity by the at least one entity, assigning the child entity to the new group.

16. The method of claim 10, wherein organizing the collection comprises:
in response to detecting a code injection event wherein an injector entity of the collection has injected code into the at least one entity, selecting a third entity group from the plurality of entity groups, the third entity group having the injector entity as a member; and
in response, assigning the at least one entity to the third entity group.

17. The method of claim 16, wherein organizing the collection further comprises:
in response to detecting the code injection event, selecting a fourth entity group from the plurality of entity groups, the fourth entity group having the injector entity as a member; and
in response, assigning the at least one entity to the fourth entity group.

18. The method of claim 10, comprising determining whether the computer system comprises malware according to an order in which the detected action, first action, and second action have occurred.

19. A non-transitory computer-readable medium storing instructions which, when executed by at least one hardware processor of a computer system, cause the computer system to form an entity manager and a scoring engine, wherein:
the entity manager is configured to organize a collection of monitored executable software entities into a plurality of entity groups according to inter-entity relations selected from a group of relations consisting of a filiation relation and a code injection relation, wherein at least one entity of the collection simultaneously belongs to more than one entity group of the plurality of entity groups; and
the scoring engine is configured, in response to a detected action of the at least one entity, to:
select a first entity group from the plurality of entity groups based on determining that the at least one entity belongs to the first entity group,
select a second entity group from the plurality of entity groups based on determining that the at least one entity belongs to the second entity group, and
in response to selecting the first and second groups, determine whether the computer system comprises malware according to a first action of a first member of the first entity group, and further according to a second action of a second member of the second entity group, the first and second members distinct from the at least one entity, the first action of the first member distinct from the second action of the second member.

\* \* \* \* \*